United States Patent
Martinson et al.

[15] 3,688,479
[45] Sept. 5, 1972

[54] LEAF COMMINUTING APPARATUS

[72] Inventors: Milton B. Martinson, 601 Gilman, Sheefield, Iowa 50475; Glenn A. Risbrudt, Dalton, Minn. 56324

[22] Filed: July 15, 1971

[21] Appl. No.: 162,762

[52] U.S. Cl. ................................56/13.2, 56/502
[51] Int. Cl. ...................................A01d 49/00
[58] Field of Search...............56/500–505, 12.8, 56/12.9, 13.1, 13.2, 13.3

[56] References Cited

UNITED STATES PATENTS

| | | | |
|---|---|---|---|
| 2,631,418 | 3/1953 | Ronning | 56/502 |
| 2,661,584 | 12/1953 | Ronning | 56/501 |
| 2,669,078 | 2/1954 | Gregory | 56/13.2 |

*Primary Examiner*—Russell R. Kinsey
*Attorney*—George F. Williamson et al.

[57] ABSTRACT

A mobile comminuting apparatus comprises a housing in which is positioned a fan driven by a power unit. A suction nozzle is connected to the housing and air entrained leaves the the like flow through the nozzle into the housing where the leaves and other material are comminuted by comminuting blades connected to the fan and to the housing. The comminuted leaves are discharged into a chute structure and outwardly through an adjustable discharge tube.

7 Claims, 6 Drawing Figures

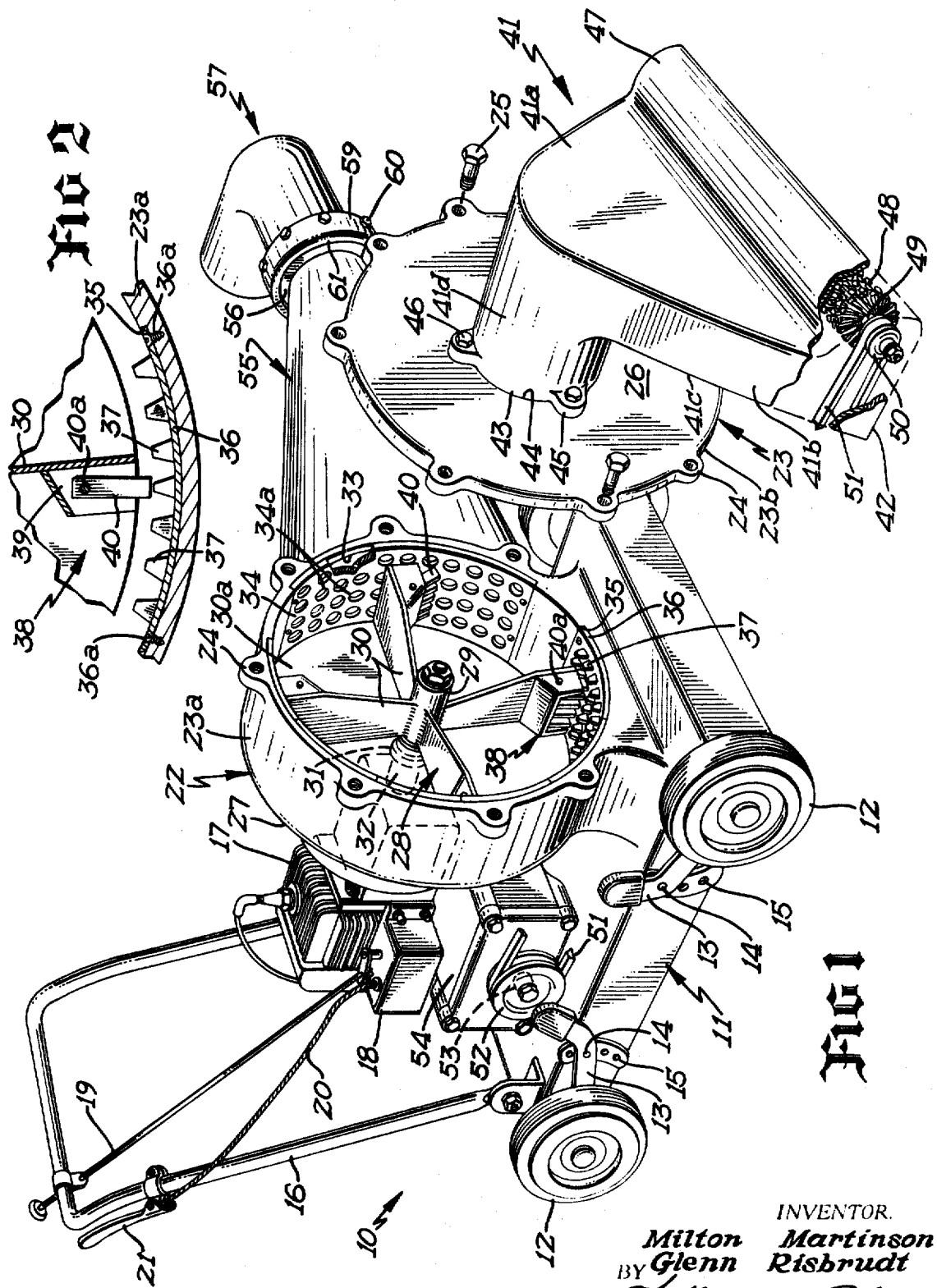

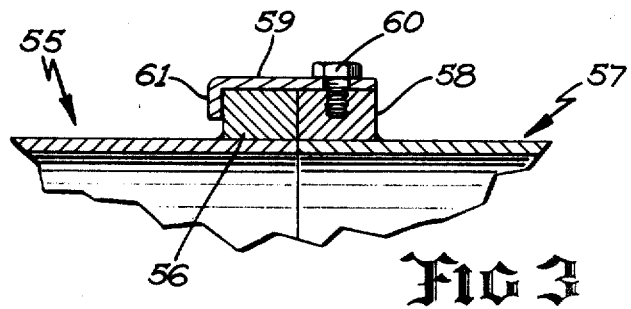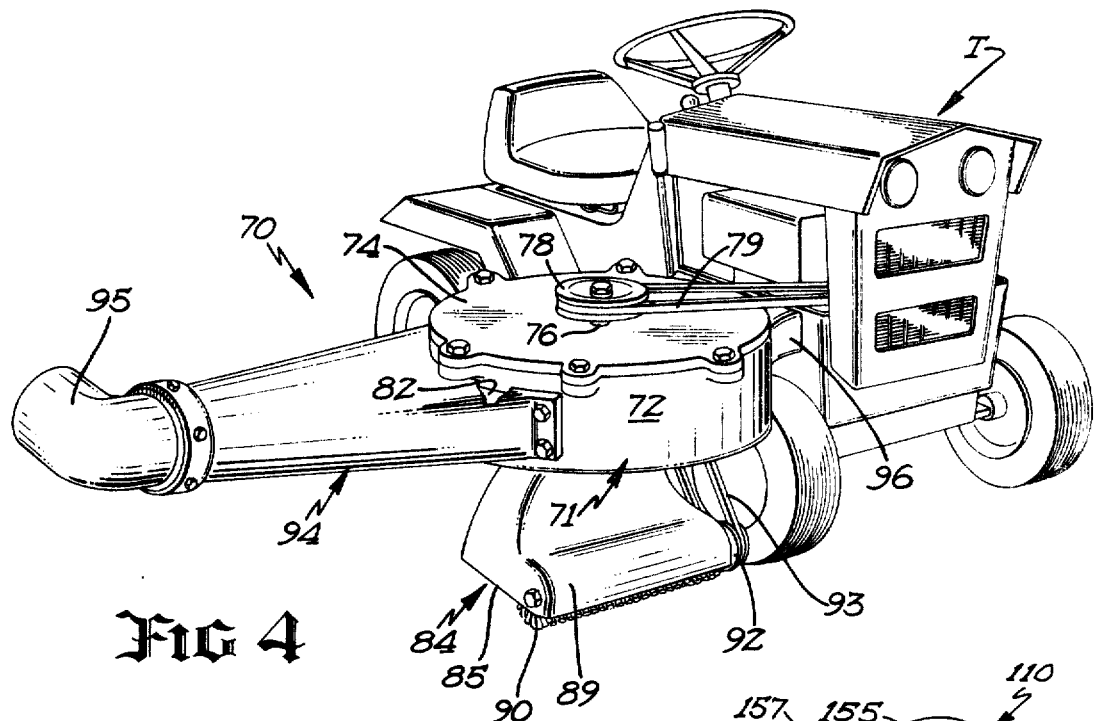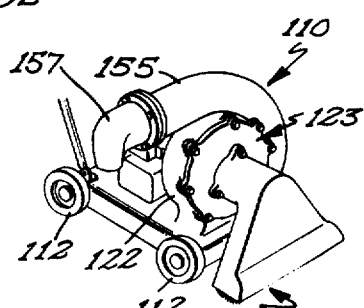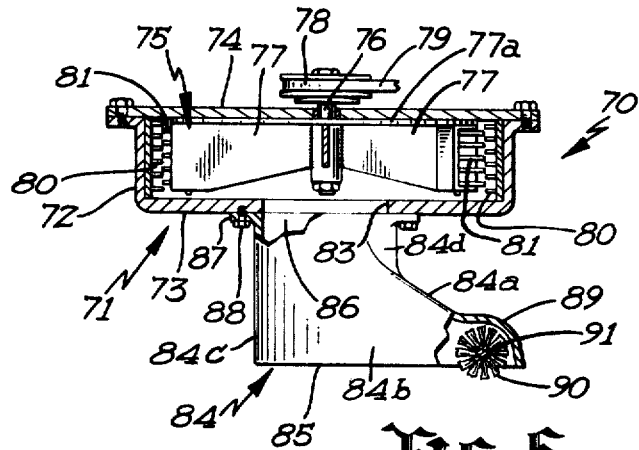

LEAF COMMINUTING APPARATUS

SUMMARY OF THE INVENTION

One of the problems associated with lawn care is the necessity of collecting and removing leaves from the lawn during the autumn season. The leaves, of course, will eventually decay and disintegrate and would be beneficial to the lawn if the decay process would not involve a long period for completion. If the leaves were allowed to remain on the lawn, because of the long period for decay, the lawn would be damaged since the leaves would tend to shield the grass in the springtime from sunlight. However, if the leaves are comminuted into small particles and redistributed over the lawn, the decay process would not take as long for completion.

It is therefore a general object of this invention to provide a mobile leaf comminuting apparatus which collects the leaves by vacuum nozzle, then comminutes the leaves, and thereafter redistributes small comminuted particles over the lawn. The apparatus may be guided by a walking attendant in the manner of a rotary mower and includes a housing having a fan therein for producing the suction at the nozzle inlet. Movable comminuting blades are mounted on the fan blades and fixed blades are mounted in the housing and these blades serve to finely comminute the leaves and other debris. An adjustable discharge chute structure permits controlled distribution of the comminuted leaf particles. The present apparatus not only permits removal of the large leaves and other large particles but the comminuting and redistribution process benefits the lawn.

BRIEF DESCRIPTION OF THE FIGURES OF THE DRAWING

FIG. 1 is a perspective view of one embodiment of the apparatus with the fan housing being illustrated in a separated or exploded condition;

FIG. 2 is a fragmentary cross-sectional view of one of the fan blades illustrating details of construction thereof;

FIG. 3 is a fragmentary cross-sectional view of a portion of the fan housing;

FIG. 4 is a perspective view of a small tractor illustrating a slightly modified form of the leaf comminuting apparatus mounted thereon;

FIG. 5 is a side view partly in elevation and partly in section illustrating the embodiment of the leaf comminuting apparatus shown in FIG. 5; and FIG. 6 is a perspective view of a modified embodiment of the apparatus.

DETAILED DESCRIPTION OF THE INVENTION

Referring now to the drawings and more specifically to FIG. 1, it will be seen that one embodiment of the novel leaf comminuting apparatus, designated generally by the reference numeral 10, is there shown. The leaf comminuting apparatus 10 has a frame 11 having ground engaging wheels 12 connected thereto for supporting the apparatus for travel along the surface of the ground. Each of the ground engaging wheels 12 is vertically adjustable and includes an adjustable wheel mounting plate 13 which is pivotally mounted on the frame 11 and each plate has an inwardly projecting stud 14 affixed to the inner surface thereof. The stud on the plate is selectively engagable in one of a plurality of openings 15 formed in the frame 11. It is pointed out that any suitable wheel adjusting system may also be used to permit the apparatus to be vertically adjusted with respect to the surface of the ground.

The apparatus also includes an elongate U-shaped handle 16 to facilitate guiding the apparatus and the frame 11 has an engine 17 thereon which is preferably a conventional internal combustion engine. The engine 17 includes a carburetor 18 and one end of a conventional choke rod 19 is connected to the carburetor in a well-known manner. The other end of the choke rod is mounted on the web portion of the handle 16. One end of a speed control cable 20 is also connected to the carburetor and the other end of the speed control cable is connected to a speed control handle 21 mounted on the handle 16. The controls for controlling the fuel mixture and the speed of the engine are conventional and do not constitute the present invention.

A generally cylindrically shaped fan housing 22 is mounted on the frame 11 and, in the embodiment shown, the axis thereof is disposed generally parallel to the ground. The housing 22 is comprised of a cylindrical wall which is formed of cylindrical wall sections 23a and cylindrical wall section 23b. Each of these sections is provided with apertured ears 24 for accommodating bolts 25 to permit the sections to be releasably secured together. The housing also includes a front end wall 26 and a rear end wall 27.

A revolvable fan 28 is positioned within the housing 22 and this fan includes a shaft 29 having a flat circular plate or disc 30a secured thereto and projecting radially outwardly therefrom. The circular plate 30a has a diameter slightly smaller than the diameter of the housing as best seen in FIG. 2. The circular plate 30a is positioned closely adjacent the rear end wall 27 of the housing.

A plurality of substantially flat fan blades 30 are secured to the shaft 29 and to the plate 30a and project radially outwardly from the shaft and axially from the plate 30a.

It will be noted that the rear edge of each blade is substantially straight while the front edge of each blade diverges outwardly so that the blades increase in width from the shaft 29. The shaft projects through the rear end wall 27 and is journalled in a suitable bearing therein and is connected by a flexible coupling 31 to the output shaft 32 of the engine 17. It will therefore be seen that when the engine is operated, the fan will be rotated.

The cylindrical wall 23 of the fan housing 22 has an outlet 33 therein and the complete outlet is formed by partial openings in each of the wall sections of the cylindrical wall. The outlet 33 is covered by a curved perforated plate 34 in the openings 34a therein are of uniform size as best seen in FIG. 1. The wall sections of the cylindrical wall 23 also have curved recesses 35 therein and a recess in one wall section 23a will be disposed in registering relation with a recess in the otherwall section 23b and each of these large recesses receive a fixed comminuting blade unit.

Each of these comminuting blade units includes a curved plate 36 positioned within the recess 35, as best seen in FIG. 2, so that the upper surface of the plate 36 forms a continuous surface with the inner surface of the cylindrical wall 23. Each blade unit has a plurality of similar fixed blades 37 struck inwardly therefrom and each blade is secured to the wall section by suitable bolts 36a. It will be noted that the fixed blade units are arranged throughout the inner circumference of the cylindrical wall 23 but that the units are spaced apart with respect to each other. The blades of each unit are arranged in transverse or axially extending rows and are also aligned in circumferentially arranged rows.

Each of the fan blades 30 has a movable blade housing 38 affixed to the outer end portion thereof and each of these housings 38 includes parallel side walls 39. Each movable blade housing 38 has a plurality of elongate similar movable blades 40 pivotally connected by a pivot 40a which extends between and is connected to the side walls 39 thereof. These movable blades 40 project outwardly from beyond their associated housing, as best seen in FIG. 2, and the end of each movable blade is positioned closely adjacent the inner surface of the cylindrical wall of the fan housing and between a pair of the fixed blades 37. It will be seen that the movable blades are swingable about an axis which is disposed substantially parallel to the axis of rotation of the fan. Pivotal movement of the movable blades 40 is limited by the housing 38 including that part of the blade housing formed by an end portion of the fan blade 30. These movable blades 40 cooperate with the fixed blades during rotation of the fan to comminute leaves and other material into a thoroughly fine condition and it will be appreciated that the communition of the particles continues until the particles are sufficiently small enough to pass through the openings 34a in the perforated plate 34.

The leaf comminuting apparatus includes a suction nozzle or head 41 which as shown has an elongate inlet 42 and also has a circular outlet 43 which is positioned in registering relation with the inlet 44 of the fan housing 22. The suction nozzle 41 has ears 45 integrally formed with the tubular portion 41d and projects outwardly from adjacent the outlet 43 thereof. These ears are suitably apertured and the apertures are disposed in registering relation with threaded apertures in the end wall 26. Suitable bolts 46 connect the suction nozzle to the fan housing.

The nozzle 41 includes a front wall 41a, side walls 41b, a rear wall 41c and a tubular portion 41d. The outlet 43 of the nozzle actually constitutes the open end of the tubular portion 41d. It will be noted that the front wall 41a of the suction nozzle, as well as the side walls 41b thereof project forwardly adjacent the respective lower end portion to define a downwardly opening elongate tranversely extending brush housing 47. This brush housing accommodates an elongate revolvable cylindrical brush 48 which includes a brush shaft 49 journalled in suitable bearings in the ends of the brush housing for rotation relative thereto. It will be noted that the shaft 49 projects outwardly beyond one of the end walls of the brush housing and has a pulley 50 affixed thereto for rotation therewith. An endless belt 51 is trained about the pulley 50 and is also trained about a pulley 52 secured to the output shaft 53 of the gear housing 54. The input shaft of the gear housing is connected to the output shaft of the engine 17 so that when the engine 17 is driven, the brush 48 will also be driven and be revolved. The brush serves to loosen compacted leaves and the like to facilitate entrainment of the leaves for movement into the fan housing 22.

An elongate tapered chute structure 55 has its enlarged end connected to the fan housing 22 so that end of the chute registers with the opening or outlet 33 of the housing 22. The outer end of the chute structure 55 has a flange 56 welded thereto and this flange projects outwardly therefrom. An adjustable discharge tube 57 is revolvably mounted on the outer end of the chute structure 55 to permit controlled discharge of the comminuting material therethrough. In this regard, it will be noted that the discharge tube 57 is of right angular construction and it has a flange 58 welded or otherwise secured to the exterior surface of the inner end thereof to project radially outwardly therefrom. A sleeve 59 is bolted to the flange 58 of the adjustable discharge tube and this sleeve extends over the flange 56 of the chute structure 55. The sleeve 59 is provided with an inturned flange 61 at one end and this flange is confronted by the flange 56 of the chute structure to prevent removal of the discharge tube from the chute structure. Since the discharge tube 57 is capable of being rotated through an arc of 360°, it will be seen that discharge of the comminuting material may be selectively directed.

During operation of the apparatus, the engine 17 will be started to rotate the fan 28. As the fan is revolved, the air is rapidly forced outwardly through the openings 34a in the perforated plate 34 and through the chute structure and finally discharged through the discharge tube 57. This produces a negative pressure at the elongate inlet of the suction nozzle 41. Since the suction nozzle is positioned closely adjacent the surface of the ground, leaves, debris and other material will be entrained in the air as it is moved through the suction nozzle and into the fan housing 22.

The material will be continuously comminuted by the action of the movable blade 40 coacting with the fixed blades 37 and the walls of the housing to cause very effective comminuting of the material until it is of a size small enough to pass through the openings 34a in the perforated plate. The material will be discharged as fine particles over the lawn and the particles are sufficiently small enough to quickly leach between the blades of grass and thereby form a highly desirable mulch. In the event that it is desirable to bag the material, a bag may be attached to the discharge tube by any conventional means.

Referring now to FIGS. 4 and 5, it will be seen that the apparatus designated generally by the reference numeral 70, is mounted on a small tractor T rather than on the wheeled chassis as illustrated in FIGS. 1 to 4. The leaf comminuting apparatus 70 also includes a fan housing 71 including a cylindrical wall 72 formed of two cast, mating wall sections in the manner of the previously discussed embodiment. The fan housing includes a lower end wall 73 and an upper end wall 74. A fan 75 is revolvably positioned within the housing and includes a shaft 76 and a plurality of fan blades 77. A flat circular plate or disc 77a is secured to the shaft 76 and projects outwardly therefrom. The blades 77 are also secured to the plate 77a and projecting axially downwardly therefrom.

The shaft 76 is journalled and supported by a suitable bearing in the end wall 74 of the fan housing and projects exteriorly thereof. A pulley 78 is affixed to the fan shaft 76 and an endless belt 79 is trained about the pulley 78. Although not shown in the drawings, the endless belt 79 will be trained about a pulley in the tractor T so that the fan is driven from the power takeoff of the tractor.

The wall sections of the cylindrical wall 72 of the housing are also recessed to accommodate a plurality of fixed blade units 80 secured thereto. The fan blades 77 also have movable blades 81 pivotally mounted in blade housings, each being located at the outer end of the fan blade 77. The fan housing has an outlet 82 in the cylindrical wall 72 therein and a curved perforated plate 82a is disposed over the outlet. The plate 82a has openings 82b therein through which the comminuted material pass. The housing also has a downwardly opening inlet 83 therein. It is pointed out that the fan housing, the fan, the fixed blades and the movable blades thereof are identical in construction to that described in the previous embodiment.

A nozzle or suction head 84 is secured to the fan housing so that the outlet 86 of the nozzle is disposed in registering relation with the inlet 83 of the fan housing. The nozzle also includes a front wall 84a, side walls 84b, a rear wall 84c and a tubular portion 84d. The tubular portion 84d of the nozzle has outwardly projecting ears 87 which are suitably apertured and which accommodate bolts 88 which threadedly engage in threaded apertures in the end wall 73 of the fan housing. It will be noted that the nozzle 84 also has an elongate inlet 85 which opens downwardly and through which the air entrained leaves and the like are moved. The front wall 84a of the nozzle projects outwardly adjacent its lower end as does the side walls 84b thereof to form a brush housing 89. The brush housing 89 accommodates an elongate cylindrical brush 90 therein, the brush having a shaft 91 which is journalled in the end walls of the brush housing. The shaft 91 projects beyond one of the end walls and has a pulley 92 keyed thereto for rotation therewith. An endless belt 93 is trained about the pulley 92 and will be trained about a driven pulley on the tractor which in turn is connected to the power takeoff of the tractor.

An elongate tapered chute structure 94 has its enlarged end positioned in registering relation with the outlet 82 of the fan housing 71 and the chute structure is secured to the housing by suitable bolts. The smaller end of the tapered chute structure is flanged and accommodates a right angular discharge tube 95. In this regard, it is pointed out that the discharge tube is identical in construction in its relationship to the chute structure as that of the previously described embodiment. Thus the discharge tube is capable of adjustment through an arc of 360°.

The fan housing 71 is provided with brackets 96 to permit mounting of the apparatus on the tractor T. In the embodiment shown, the leaf comminuting apparatus is mounted adjacent one side of the tractor.

In operation, when the tractor T is being driven, the nozzle 84 will be positioned closely adjacent the surface of the ground and rotation of the fan will produce the negative pressure or suction at the nozzle inlet. The revolving brush will serve to loosen any compacted leaves or other material and the air entrained leaves will pass through the fan housing inlet and will be comminuted by the movable and fixed comminuting blade in the housing until the particles are sufficiently small enough to pass through the openings 82b in the perforated plate 82a. The materials may be discharged upon the ground through the discharge tube 95 or they may be collected in a bag as desired.

Referring now to FIG. 6, it will be seen that a slightly modified form of the leaf comminuting apparatus is there shown and is designated generally by the reference numeral 110. This apparatus 110 is substantially identical to the embodiment of FIG. 1 and includes a housing 122 having a suction head or nozzle 141 secured to the front wall 123 thereof and projecting forwardly and downwardly therefrom. Suitable ground engaging wheels 112 support the apparatus for travel over the surface of the ground. An internal combustion engine (not shown) or other power source is provided for operating the fan within the fan housing 122.

This apparatus 110 differs only from the embodiment in FIG. 1 in that the elongate tapered chute structure 155 is coiled about the fan housing 122 and discharges on the opposite side from the outlet of the fan housing. This convoluted discharge chute 155 permits a more compact structure and, of course, permits effective maneuvering in rather closely confined areas. In the embodiment shown, the discharge chute is provided with an adjustable discharge nozzle which is revolvably mounted on the outer end thereof to permit discharge in a selected direction.

From the foregoing, it will be seen that we have provided a novel mobile leaf comminuting apparatus which not only is capable of collecting the leaves but also comminutes the leaves into small particles and permits redistribution of these comminuted particles upon the surface of the ground. It has been found that the present apparatus very quickly and efficiently comminutes the leaves and requires only a small conventional horse power engine to power the unit. In this regard, an engine comparable to the size of engines used on the smaller rotary lawn mowers more than adequately provides the power needed in the comminuting operation.

It will thus be seen that we have provided a novel leaf comminuting apparatus which is not only of simple and inexpensive construction, but one which functions in a more efficient manner than any heretofore known comparable device.

What is claimed is:

1. A mobile comminuting apparatus adapted to be moved along the surface of the ground for collecting comminuting leaves and the like comprising
    a fan housing including a cylindrical wall and closed end walls, an inlet opening in said housing and an outlet in said cylindrical wall,
    a suction nozzle connected with said housing and having an elongate inlet and an outlet, said suction nozzle inlet being positioned closely adjacent to the surface of the ground and said outlet registering with the inlet of said fan housing,
    a fan revolvably mounted in said housing including a fan shaft journalled in one of said end walls, a plurality of fan blades affixed to the shaft and revolvable therewith to cause air to flow from the nozzle inlet into said housing and outwardly through the outlet to thereby provide a suction at the inlet of the nozzle, a power unit mounted adjacent said fan housing and having a revolvable output shaft drivingly connected with the fan shaft for driving the same, each of said fan blades having a plurality of movable comminuting blades pivotally connected therewith and projecting outwardly beyond the end portion of the associated fan blade, the outer end portions of said movable comminuting blades being disposed closely adjacent the inner wall surfact of the fan housing and cooperating therewith to comminute leaves and the like into small particles, a perforated plate positioned over the outlet in said fan housing, an elongate hollow chute having one end thereof connected to said housing and comminuting with the outlet therein, an adjustable angular discharge tube revolvably mounted on the outer end of the chute and through which the comminuting material is discharged.

2. The apparatus as defined in claim 1 and a plurality of circumferentially arranged spaced apart fixed blades secured to the inner surface of the cylindrical wall of the fan housing and projecting inwardly therefrom, said movable comminuting blades having their end portions moving between adjacent of said fixed blades and cooperating therewith for comminuting leaves and material in the fan housing.

3. The apparatus as defined in claim 1 and a wheeled chassis, said fan housing and nozzle being mounted on said wheeled chassis for travel along the surface of the ground, a handle on said chassis to facilitate movement of the chassis along the surface of the ground.

4. The apparatus as defined in claim 1 and a plurality of fixed blade units each including a curved plate removably secured to the inner wall surface of said cylindrical wall, each plate having a plurality of fixed blades integrally formed therewith and projecting therefrom, said fixed comminuting blades being arranged in circumferentially extending rows.

5. The apparatus as defined in claim 1 wherein each of said fan blades has a small housing affixedly secured to the outer end thereof, a plurality of said movable comminuting blades projecting into each of said small housings, and means pivotally connecting said plurality of comminuting blades to its associated housing for pivotal movement about an axis extending substantially parallel to axis of rotation of the fan blades.

6. The apparatus as defined in claim 1 wherein said elongated inlet of the suction nozzle has its length dimension extending transversely of the direction of travel of said apparatus.

7. The apparatus as defined in claim 1 wherein said discharge tube is revolvably mounted on the outer end of said discharge chute for movement relative thereto throughout an arc of 360 degrees.

* * * * *